US010125297B2

(12) United States Patent
Lentz et al.

(10) Patent No.: US 10,125,297 B2
(45) Date of Patent: Nov. 13, 2018

(54) DIMENSIONALLY STABLE PHASE CHANGE MATERIAL AND A CONTINUOUS PROCESS FOR MAKING SAME

(71) Applicant: Microtek Laboratories, Inc., Dayton, OH (US)

(72) Inventors: Carl M. Lentz, Waynesville, OH (US); Teresa T. Virgallito, Beavercreek, OH (US); Jerry K. Lawson, Riverside, OH (US)

(73) Assignee: Microtek Laboratories, INC., Dayton, OH (US)

( * ) Notice: Subject to any disclaimer, the term of this patent is extended or adjusted under 35 U.S.C. 154(b) by 205 days.

(21) Appl. No.: 15/000,376

(22) Filed: Jan. 19, 2016

(65) Prior Publication Data

US 2016/0208155 A1    Jul. 21, 2016

Related U.S. Application Data

(60) Provisional application No. 62/105,042, filed on Jan. 19, 2015.

(51) Int. Cl.
*C09K 5/00* (2006.01)
*C09K 5/06* (2006.01)

(52) U.S. Cl.
CPC .................. *C09K 5/063* (2013.01)

(58) Field of Classification Search
None
See application file for complete search history.

(56) References Cited

U.S. PATENT DOCUMENTS 7,047,701 B2    5/2006  Bonetto et al.
8,070,876 B1   12/2011  Jiang
(Continued)

FOREIGN PATENT DOCUMENTS

| CN | 101121876 | 2/2008 |
| WO | 2011/0129854 | 10/2011 |
| WO | 2012/044544 | 4/2012 |

OTHER PUBLICATIONS

PCT, International Search Report and Written Opinion, International Application No. PCT/US2016/013838 (dated Mar. 21, 2016).
(Continued)

*Primary Examiner* — Necholus Ogden, Jr.
(74) *Attorney, Agent, or Firm* — FisherBroyles, LLP; Susan M. Oiler (57) ABSTRACT

Methods for producing a dimensionally stable phase change material (PCM), and dimensionally stable PCMs are disclosed. The methods include providing a porous base material, mixing a phase change material having a polar functional group with a substance that increases the polar attraction of the phase change material for the porous base material to form a mixture thereof; and, thereafter, mixing the mixture with the porous base material until a selected saturation of phase change material in the porous base material is reached. The methods may include filtering the porous base material after the selected saturation is reached to form a cake of dimensionally stable PCM and, thereafter, reducing the size of the dimensionally stable PCM to an average mean particle size of about 10 to about 50 μm, or more preferably 20 to 30 μm.

14 Claims, 6 Drawing Sheets

(56) References Cited

U.S. PATENT DOCUMENTS

| | | |
|---|---|---|
| 8,091,309 B2 | 1/2012 | Wagner |
| 8,221,910 B2 | 7/2012 | Hartmann et al. |
| 8,359,750 B2 | 1/2013 | Tran |
| 2002/0011587 A1 | 1/2002 | Suppes |
| 2004/0069454 A1 | 4/2004 | Bonsignore et al. |
| 2004/0206941 A1 | 10/2004 | Gurin |
| 2007/0134411 A1 | 6/2007 | Cont et al. |
| 2007/0212967 A1* | 9/2007 | Grynaeus ............. A43B 1/00 442/340 |
| 2012/0096716 A1 | 4/2012 | Tran |
| 2012/0196040 A1 | 8/2012 | Wilk et al. |
| 2013/0101735 A1 | 4/2013 | Tran |
| 2013/0298991 A1 | 11/2013 | Parker et al. |

OTHER PUBLICATIONS

Zhang, et al. "Development of Thermal Energy Storage Concrete", Cement Concrete Res., vol. 34(6), pp. 927-934 (2004).

Sari, et al. "Preparation, Thermal Properties and Thermal Reliability of Capric Acid/Expanded Perlite Composition for Thermal Energy Storage", Materials Chemistry and Physics, vol. 109, pp. 459-464 (2008).

Kenisarina, et al. "Form-Stable Phase Change Materials for Thermal Energy Storage", Renewable and Sustainable Energy Reviews, vol. 16, pp. 1999-2040 (2012).

\* cited by examiner

FIG. 1

Control Group

| Sample No. | PCM (g) | PCM type | $\Delta H_f$ (J/g) | Free PCM % | Theoretical dH/g | Filtered Weight (g) | PCM Added After Filtration (g) | Initial Mix Ratio | Mix Time (min) | Milling Power Setting | Milling Time (min) | Particle Size (μm) |
|---|---|---|---|---|---|---|---|---|---|---|---|---|
| 98-87 | 90 | PureTemp 28 | 118 | 1.7 | - | - | - | 3:1 | - | - | 60 | - |
| 98-88 | 90 | PureTemp 28 | 86 | <0.1 | 64.4 | 52.11 | 0.0 | 3:1 | 30 | 1 | 6 | 43.015 |
| 98-89 | 90 | PureTemp 28 | 110 | 2.7 | 112.7 | 68.71 | 0.0 | 3:1 | 30 | 1 | 6 | 37.916 |
| 98-91 | 120 | methyl palmitate | 130 | 3.3 | 120.0 | 57.59 | 17.41 | 4:1 | 40 | 1 | 6 | 27.627 |
| 98-92 | 120 | methyl palmitate | 118 | 2.3 | 112.2 | 58.37 | 10.0 | 4:1 | 40 | 1 | 8 | 25.757 |
| 98-93 | 120 | methyl palmitate | 134 | 3.0 | 118.0 | 73.15 | 0.0 | 4:1 | 40 | 1 | 8 | 30.841 |
| 98-94 | 150 | methyl palmitate | 115 | 3.3 | 115.2 | 63.76 | 7.0 | 5:1 | 25 | 1 | 12 | 21.071 |
| 98-95 | 150 | methyl palmitate | 109 | 2.3 | 112.3 | 61.38 | 7.0 | 5:1 | 25 | 1 | 12 | 30.071 |
| 98-96 | 150 | methyl palmitate | 115 | 2.3 | 119.3 | 74.32 | 0.0 | 5:1 | 25 | 1 | 12 | 29.763 |
| 98-97 | 270 | methyl palmitate | 126 | 3.7 | 117.5 | 67.76 | 5.0 | 9:1 | 45 | 1 | 12 | 28.637 |
| 98-98 | 120 | methyl palmitate | 111 | 2.3 | 114.0 | 69.78 | 0.0 | 4:1 | 40 | 1 | 8 | 26.163 |
| 98-101 | 120 | methyl palmitate | 134 | 3.3 | 115.0 | 75.56 | 0.0 | 4:1 | 40 | 1 | 8 | - |
| 105-73 | 150 | methyl palmitate | 115 | 0.3 | 106.1 | 63.89 | 0.0 | 5:1 | 20 | 2 | 8 | - |
| 105-74 | 150 | methyl palmitate | 129 | 4.7 | 130.8 | 86.74 | 0.0 | 5:1 | 20 | 2 | 8 | - |

*expanded pearlite for all experiments = 30.0g; no polar attraction booster; mix temperature 75°C*

FIG. 2A

Trials

| Sample No. | Polar attraction booster (g) | PCM (g) | PCM type | Additive (g) | ΔHf (J/g) | Free PCM % | Theoretical dHf/kg | Filtered Weight (g) | Initial Mix Ratio | Mix Time (min) | Milling Power Setting | Particle Size (μm) |
|---|---|---|---|---|---|---|---|---|---|---|---|---|
| 98-99 | Elvax 410: 3.7 | 120 | methyl palmitate | - | 120 | 0.7 | 109.6 | 74.53 | 4:1 | 40 | 1 | 29.751 |
| 98-103 | Elvax 410: 3.7 | 200 | methyl palmitate | - | 134 | 3.7 | 119.0 | 87.62 | 6.7:1 | 20 | 1 | - |
| 98-104 | Elvax 410: 3.7 | 150 | methyl palmitate | - | 147 | 7.0 | 134.9 | 103.58 | 5:1 | 20 | 1 | 26.794 |
| 98-105 | Elvax 410: 3.7 | 150 | methyl palmitate | - | 134 | 6.0 | 130.4 | 97.69 | 5:1 | 20 | 1 | 20.891 |
| 98-106 | Elvax 410: 3.7 | 150 | methyl palmitate | - | 135 | 5.3 | 126.3 | 91.42 | 5:1 | 20 | 2 | 19.537 |
| 98-108 | Elvax 210w: 3.7 | 150 | methyl palmitate | - | 125 | 4.3 | 134.4 | 102.71 | 5:1 | 20 | 1 | 36.171 |
| 98-109 | Vybar 103: 3.7 | 150 | methyl palmitate | - | 125 | 2.6 | 119.8 | 84.01 | 5:1 | 20 | 1 | 84.693 |
| 98-110 | Elvax 410: 3.7 | 150 | methyl palmitate | - | 113 | 3.0 | 125.8 | 90.86 | 5:1 | 20 | 1 | 40.077 |
| 98-111 | Elvax 410: 3.7 | 150 | methyl palmitate | - | - | 7.0 | 120.2 | 84.47 | 5:1 | 20 | 1 | - |
| 98-112 | Elvax 410: 3.7 | 150 | methyl palmitate | - | 129 | 4.0 | 131.9 | 99.03 | 5:1 | 15 | 1 | 35.717 |
| 98-114 | Elvax 410: 3.7 | 150 | methyl palmitate | - | 120 | 5.0 | 119.3 | 88.45 | 5:1 | 20 | 1 | 28.422 |
| 98-125 | Elvax 410: 3.7 | 135 | methyl palmitate | - | 105 | 0.7 | 120.4 | 87.70 | 5:1 | 20 | 1 | - |
| 98-126 | Elvax 410: 7.4 | 300 | methyl palmitate | - | 123 | 1.7 | 120.3 | 169.14 | 5:1 | 20 | 1 | - |
| 98-127 | Elvax 410: 7.4 | 300 | methyl palmitate | - | 121 | 2.0 | 121.7 | 172.15 | 5:1 | 20 | 1 | - |
| 98-182 | Elvax 410: 3.7 | 150 | PureTemp 28 | - | 105 | 1.0 | 104.7 | 62.98 | 5:1 | 20 | 1 | - |
| 98-187 | Elvax 410: 3.7 | 150 | methyl palmitate | potassium palmitate: 15 | 129 | 5.3 | 133.5 | 90.28 | 5:1 | 20 | 2 | - |
| 98-192 | Elvax 410: 3.7 | 150 | methyl palmitate | KOH: 10 | 96 | 0.3 | 115.9 | 71.31 | 5:1 | 20 | 1 | - |
| 105-16 | Elvax 410: 3.7 | 150 | capric acid | - | 91 | 1.3 | 111.6 | 67.84 | 5:1 | 20 | 1 | - |
| 105-69 | Elvax 410: 18.5 | 750 | methyl palmitate | - | - | 8.3 | 156.1 | 683.19 | 5:1 | 20 | 2 | - |
| 105-71 | Elvax 410: 3.7 | 150 | methyl palmitate | BH₃O₃: 6.9 | 119 | 2.0 | 109.6 | 88.49 | 5:1 | 20 | 2 | - |
| 105-72 | Elvax 410: 3.7 | 150 | methyl palmitate | BH₃O₃: 6.9 | 99 | 3.8 | 112.0 | 68.20 | 5:1 | 20 | 2 | - |
| 105-90 | Elvax 410: 3.7 | 150 | methyl palmitate | BH₃O₃: 6.9 | 110 | 2.7 | 122.9 | 77.79 | 5:1 | 20 | 2 | - |
| 105-91 | Elvax 410: 3.7 | 150 | methyl palmitate | BH₃O₃: 6.9 | 107 | 2.3 | 129.7 | 85.31 | 5:1 | 20 | 2 | - |
| 105-92 | Elvax 410: 3.7 | 150 | methyl palmitate | Al₂O₃: 6.9 | 99 | 0.3 | 125.1 | 80.13 | 5:1 | 20 | 2 | - |
| 105-93 | Elvax 410: 3.7 | 150 | methyl palmitate | BH₃O₃: 10.4 | 111 | 3.3 | 120.0 | 74.97 | 5:1 | 20 | 2 | - |
| 105-94 | Elvax 410: 3.7 | 150 | methyl palmitate | BH₃O₃ + graphene: 6.9 | 113 | 2.7 | 128.4 | 83.85 | 5:1 | 20 | 2 | - |
| 105-96 | Elvax 410: 3.7 | 150 | methyl palmitate | - | 105 | 0.3 | 114.1 | 69.81 | 5:1 | 20 | 2 | - |
| 105-97 | Elvax 410: 3.7 | 150 | methyl palmitate | palmitic acid: 4.5 | 119 | 1.0 | 128.0 | 83.34 | 5:1 | 20 | 2 | - |
| 105-98 | Elvax 410: 3.7 | 150 | methyl palmitate | palmitic acid: 8.3 | 114 | 0.3 | 121.4 | 76.35 | 5:1 | 20 | 2 | - |
| 108-51 | Elvax 410: 3.7 | 150 | PureTemp 60 | - | 124 | <0.3 | 118.2 | 73.33 | 5:1 | 20 | n/a | - |
| 108-52 | Elvax 410: 3.7 | 150 | PureTemp 60 | - | 122 | 0.3 | 117.5 | 72.76 | 5:1 | 20 | n/a | - | expanded pearlite for all experiments = 30.0g; mix temperature 75°C; milling time 8 minutes (except for sample 108-51 and 108-52, which were not milled); no PCM was added after filtration

FIG. 2B

Additional Trials

| Sample No. | Polar attraction booster (g) | PCM (g) | PCM type | ΔHf (J/g) | Free PCM % | Theoretical ΔHf J/g | Filtered Weight (g) | Initial Mix Ratio | Mix Time (min) | Milling Power Setting | Particle Size (μm) |
|---|---|---|---|---|---|---|---|---|---|---|---|
| 98-100 | Elvax 410: 3.7 | 150 | methyl palmitate | 146 | 4.3 | 130.6 | 97.11 | 5:1 | 20 | 1 | - |
| 98-102 | Elvax 410: 3.7 | 150 | methyl palmitate | 105 | 0.3 | 118.3 | 82.50 | 5:1 | 20 | 1 | - |
| 98-113 | Elvax 410: 3.7 | 150 | methyl palmitate | 125 | 2.0 | 129.6 | 98.80 | 5:1 | 20 | 1 | 20.156 |
| 98-116 | Elvax 410: 3.7 | 150 | methyl palmitate | 106 | 1.3 | 117.5 | 81.74 | 5:1 | 20 | 1 | 47.939 |
| 98-117 | Elvax 410: 3.7 | 150 | methyl palmitate | 114 | 0.3 | 120.7 | 84.99 | 5:1 | 20 | 1 | 36.595 |
| 98-118 | Elvax 410: 3.7 | 150 | methyl palmitate | 114 | <0.1 | 120.7 | 84.98 | 5:1 | 20 | 1 | 32.398 |
| 98-119 | Elvax 410: 3.7 | 150 | methyl palmitate | 118 | 0.3 | 114.7 | 79.04 | 5:1 | 20 | 1 | - |
| 98-120 | Elvax 410: 3.7 | 150 | methyl palmitate | 116 | 2.3 | 121.3 | 85.64 | 5:1 | 20 | 1 | 33.249 |
| 108-11 | Elvax 410: 192.4 | 7800 | methyl palmitate | 120 | 1.7 | 132.3 | 4643 | 5:1 | 20 | n/a | - |

*expanded pearlite for all experiments = 30.0g; mix temperature 75°C; milling time 8 minutes; no PCM was added after filtration, no additives were added*

DIMENSIONALLY STABLE PHASE CHANGE MATERIAL AND A CONTINUOUS PROCESS FOR MAKING SAME

RELATED APPLICATIONS

This application claims the benefit of U.S. provisional application No. 62/105,042, filed Jan. 19, 2015, and incorporates the same by reference in its entirety.

TECHNICAL FIELD

The present application relates to dimensionally stable phase change materials, in particular, a polar phase change material mixed with vinyl acetate and then absorbed by a substrate such as expanded perlite and a continuous method of making the same.

BACKGROUND

Thermal energy storage (TES) systems using phase change material (PCM) have been recognized as one of the most advanced energy technologies in enhancing the energy efficiency and sustainability of buildings. Now the research focus is on suitable methods to incorporate PCMs within buildings or the materials used to construct the buildings. There are several methods to use phase change materials (PCMs) in thermal energy storage (TES) for different applications. Microencapsulation is one of the well-known and advanced technologies for better utilization of PCMs with building parts, such as walls, roofing material, and floors, besides within the building materials themselves. Microencapsulated phase change materials as latent heat thermal storage (LHTS) systems for building applications offer a challenging option to be employed as an effective thermal energy storage and retrieval device.

One type of PCM is a substance with a high heat of fusion which, melting and solidifying at a certain temperature, is capable of storing and releasing large amounts of energy. Heat is absorbed or released when the material changes from solid to liquid and vice versa; thus, PCMs are classified as latent heat storage units.

Also, PCMs as latent heat storage units have been used in textiles, packaging, electronics, etc. For example, the PCM may be encapsulated and included in a winter jacket as a microcapsule. The microcapsule, specifically the PCM, would initially absorb the wearer's body heat and store it (via melting of the PCM) until the body temperature drops from the outside temperature, at which time the heat stored in the PCM is released (via solidification of the PCM), thereby giving warmth to the wearer. Throughout the process, the capsule wall contains the PCM.

Micro- or macro-encapsulation involves some disadvantages such as super cooling, and instability of some hydrates. The encapsulation process can also raise the cost of thermal energy products substantially in comparison to bulk PCMs. Also, capsules can be susceptible to rupture and/or leakage of the PCMs. Since the development of microencapsulated PCMs, there has been a constant need for improved storage vehicles for phase change materials, in particular one that does not include microencapsulation.

Form stable compositions based on phase change materials and porous structured materials have been reported by Zhang D. Tians, Xiao D. *Development of thermal energy storage concrete*, Cement Concrete Res 2004; 34(6): 927-34. The porous structured material may be expanded perlite as taught by CN 101121876 and by A. Sari and A. Karaipekli, *Preparation, thermal properties and thermal reliability of capric acid/expanded perlite composition for thermal energy storage*, Material Chemistry and Physics 109(2008) 459-464. The limitations to these current disclosures for impregnating expanded perlite with a PCM is that vacuum impregnation is required along with pretreatment of the perlite to remove bound water therefrom. Additionally, the amount of the PCM introduced into the expanded perlite is only sufficient to yield a material with a $\Delta H_f$ of 90 J/g.

There is a need for a more efficient and cost effective continuous process of impregnating an absorbent material such as expanded perlite with a PCM, in particular one that does not require the use of vacuum and one that can hold more PCM in the same size particles, and hence yield higher enthalpy values.

BRIEF DESCRIPTION OF THE DRAWINGS

FIG. 2B is a chart of test results for various phase change materials absorbed/impregnated into expanded perlite using the method of FIG. 1.

DETAILED DESCRIPTION

The following detailed description will illustrate the general principles of the invention, examples of which are additionally illustrated in the accompanying drawings. In the drawings, like reference numbers indicate identical or functionally similar elements.

As used herein, "dimensionally stable" means any material whose shape does not alter appreciably with changes in temperature, moisture, and loading conditions.

Figure 1:
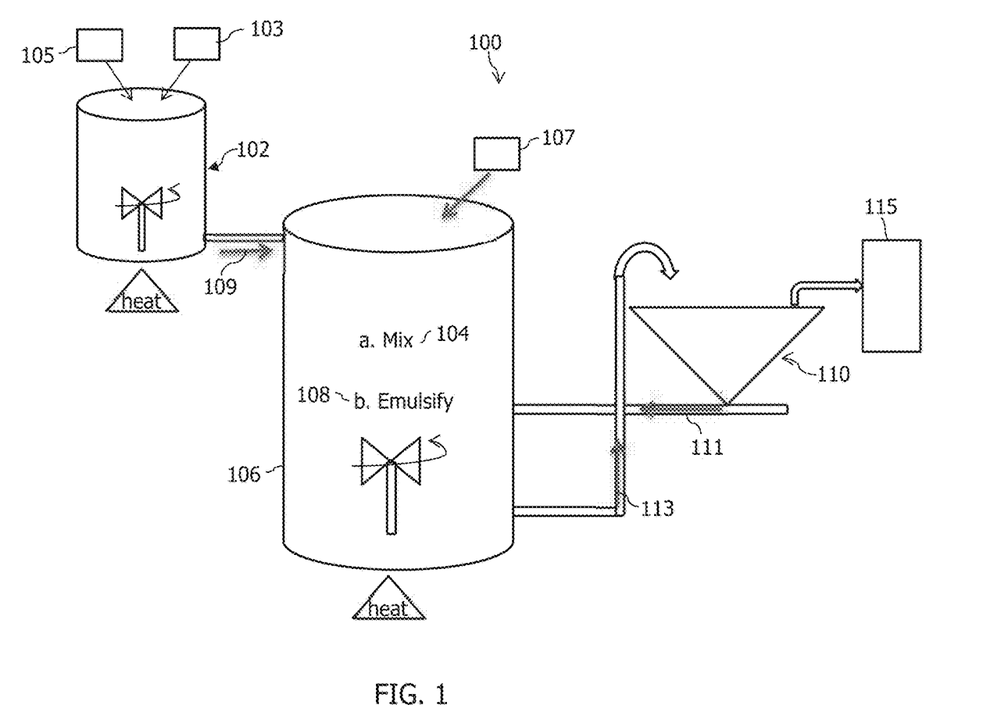
FIG. 1 is a flow chart diagram of one embodiment of a process for making a form stable PCM loaded on absorbent material particles.

Referring to FIG. 1, a flow diagram is depicted that represents an overview of a process 100 for producing dimensionally stable PCMs, in particular, a PCM having a polar functional group incorporated into a porous base material, for example, an expanded perlite. The process 100 includes, first, mixing 102 a PCM 103 and a polar attraction booster 105, which is a substance added to increase the polar attraction between the PCM 103 and a porous base material 107, to form a mixture 109 thereof. The PCM 103 is typically heated before or during the mixing with the polar attraction booster 105 to put the PCM and/or the polar attraction booster 105 in the liquid phase for ease of mixing. In one embodiment, equal parts of PCM and polar attraction booster are mixed in the vessel for mixing 102, but is not limited thereto. The polar attraction booster may be about 10% to about 90% by weight of the mixture of PCM and attraction booster.

The mixture 109 is added to a heated vessel 106 that may contain recycled filtrate 111 (i.e., PCM and polar attraction booster mixture 109) from a prior batch. The porous base material 107 is added to the heated vessel 106 and is mixed 104 with the mixture 109 of PCM and the polar attraction booster 105. Once the porous base material 107 has reached a desired or maximum saturation of PCM and/or mixture 109 therein, the same may be subsequently emulsified 108 until a selected average mean particle size for the saturated porous base material 113 is reached. A desirable average mean particle size at this stage is about 250 μm to about 20 μm, or more preferably about 100 μm to about 20 μm, or even more preferably about 50 μm to about 20 μm.

Next, the saturated porous base material 113 is filtered 110 to form a dry/drier form of a dimensionally stable PCM 115. After filtration, the dimensionally stable PCM 115 may be a cake or, typically with additional drying, a dry powder. The method 100 may also include introducing the filtrate 111 from filtering the saturated porous base material 113 back into the vessel 106 for subsequent mixing with additional porous base material 107 in a continuous manufacturing process.

The method 100 may include reducing the size (not shown) of the dimensionally stable phase change material 115 to an average mean particle size of about 20 μm to about 50 μm. In one embodiment, the average mean particle size is about 20 μm to about 30 μm. The reduction in size may be accomplished by any variety of particle size reduction techniques, including milling or grinding. Known commercially available or hereinafter developed equipment may be used to accomplish the particle size reduction.

Porous Base Material

In one embodiment, the porous base material 107 is expanded perlite. The higher the porosity of the porous material, the better the absorption of the PCM and attraction booster mixture. The porosity is a result of heating perlite, typically in a temperature range of 700-1200° C. In another embodiment, the porous base material includes one or more of expanded perlite, vermiculite (including expanded vermiculite), alumina, diatomaceous earth, zeolites (silica aluminate absorbent materials), activated carbon, or modified clay.

Phase Change Material

The phase change material is a heat-absorbing material that has a melting point at about −30° C. to about 150° C. and, for the methods disclosed herein, is one having one or more polar functional groups. The polar functional groups of the phase change material include one or more of an alcohol, glycol, ketone, alkyl halide, ester, diesters, carboxylic acid, anhydride, epoxide, amine, nitrile, ether, thiol, carbonate, and amide. The polar nature of the PCM may also be attributed to the inclusion of an organometallic material, for example, but not limited thereto, carboxylates, alkyl ammonium tetrachlorometallates, and/or quaternary ammonium salts.

Examples of suitable PCMs include saturated or unsaturated $C_6$-$C_{30}$-fatty acids; fatty alcohols; esters; and natural and synthetic waxes having polar functional groups. Examples of saturated or unsaturated $C_6$-$C_{30}$-fatty acids include, but are not limited to, lauric, stearic, palmitic, myristic, oleic or behenic acid, and eutectic mixtures of carboxylic acids such as decanoic acid with myristic, palmitic or lauric acid. Examples of fatty alcohols include, but are not limited to, lauryl, stearyl, oleyl, myristyl, cetyl alcohol, mixtures such as coconut fatty alcohol, and the so-called oxo alcohols which are obtained by hydroformylation of olefins and further reactions. Examples of C-esters include, but are not limited to, $C_1$-$C_{10}$-alkyl esters of fatty acids, such as propyl palmitate, methyl stearate or methyl palmitate, and their eutectic mixtures or methyl cinnamate. Examples of natural and synthetic waxes include, but are not limited to, montan acid waxes, montan ester waxes, oxidized waxes, polyvinyl ether wax, ethylene vinyl acetate wax, and EPOLENE® wax. Another example is a polyethylene glycol having a molecular weight within the range of 2000 to 20,000 g/mol. Mixtures of any of the above PCMs are possible, in particular to tailor as a preselected melt temperature for a dimensionally stable PCM.

Polar Attraction Booster

The polar attraction booster is a substance added to the PCM 103 to increase the polar attraction between the PCM 103 and the porous base material 107. One example of a polar attraction booster is a substance that includes vinyl acetate. A suitable substance is one that includes vinyl acetate and has a melting point not too high to interfere with the method disclosed herein and a reasonably high flow index so that it will mix into the PCM and the perlite. In one embodiment, the polar attraction booster is an ethylene-vinyl acetate copolymer resin. Such resins are commercially available from DuPont™ under the brand name ELVAX®. In one embodiment, a suitable resin is ELVAX® 410 EVA copolymer resin, which has about 18% by weight vinyl acetate comonomer content and a thermal stabilizer (BHT antioxidant), a melting point of about 73° C., and a melt flow rate at 190° C/2.16 kg of about 500 g/10 min. In another embodiment, a suitable resin is ELVAX® 210W EVA copolymer resin, which has about 28% by weight vinyl acetate comonomer content, contains a "W" amide additive and a thermal stabilizer (BHT antioxidant), has a melting point of about 60° C., and has a melt flow rate at 190° C/2.16 kg of about 400 g/10 min. In another embodiment, the polar attraction booster may be a hyper-branched polymer having a softening point of about 74° C. and a viscosity of about 345 cP at 99° C., available from Baker Hughes, Inc. under the brand name VYBAR™ 103. Other suitable polymers include polymethacrylate materials sold under the brand name EUDRAGIT® by Evonik Industries.

Additives

The methods disclosed herein may include the addition of one or more Lewis acids and/or Lewis bases to the PCM before mixing with the attraction booster or while mixing with the attraction booster to increase the thermal stability of the dimensionally stable PCM 115. The additives are added to the PCM at about 2% by weight based on the weight of the PCM. Examples of Lewis acids and Lewis bases are included in Table 1 below, but are not limited thereto.

TABLE 1

| Additive | Temperature (° C.) | Time (hours) | Enthalpy ΔH (J/g) | PCM |
|---|---|---|---|---|
| None | 150 | 6 | 26 | Methyl Palmitate |
| None | 130 | 6 | 106 | Methyl Palmitate |
| None | 90 | 6 | 112 | Methyl Palmitate |
| Magnesium Stearate | 150 | 6 | 32 | Methyl Palmitate |
| Potassium Palmitate | 150 | 6 | 63 | Methyl Palmitate |
| Potassium Palmitate | 130 | 6 | 112 | Methyl Palmitate |
| Potassium Palmitate | 90 | 6 | 113 | Methyl Palmitate |
| Boric Acid | 150 | 6 | 89 | Methyl Palmitate |
| Alumina | 150 | 6 | 2 | Methyl Palmitate |
| Boric Acid/Graphene | 150 | 6 | 87 | Methyl Palmitate |
| Stearic Acid | 150 | 6 | 31 | Methyl Palmitate |

The data in Table 1 shows that boric acid and a potassium salt of palmitic acid have a positive effect on the thermal stability of the form stable PCM, i.e., results in a higher enthalpy value. It is believed that there are both acidic and basic sites in the cavities of the expanded perlite that catalyze the decomposition of the PCM absorbed in the matrix, and the acidic and basic nature of the additives to some degree neutralizes the acidic and/or basic sites within the expanded perlite. This insitu neutralization process results in a slowing down of the thermal degradation of the PCM.

Dimensionally Stable PCM

The dimensionally stable PCM resulting from the method above typically has an average mean particle size of about 20 μm to about 50 μm. In one embodiment, the average mean particle size is about 20 μm to about 30 μm, which may have been achieved by a milling or grinding step. In one embodiment, the dimensionally stable PCMs have a maximum of 2% free PCM leakage. In another embodiment, the dimensionally stable PCMs have superior thermodynamic and kinetic properties, which may include an enthalpy (H) greater than 100 J/g as determined by differential scanning calorimetry, or more preferably greater than 120 J/g, or even more preferably greater than 135 J/g. These values are achieved without a coating on the porous base material after absorption of the mixture of the PCM and the polar attraction booster.

The enthalpy is one way to measure the amount of PCM loaded in the pores of the porous substrate after the addition of the PCM. For example, methyl palmitate, a selected PCM, has an enthalpy of 190 J/g. If the dimensionally stable PCM 115 made with methyl palmitate has an enthalpy of 130 J/g, that means the dimensionally stable PCM is 68% by weight PCM loaded (130 J/g /190 J/g×100=68%) and the balance, 32%, is expanded perlite.

Figure 4:
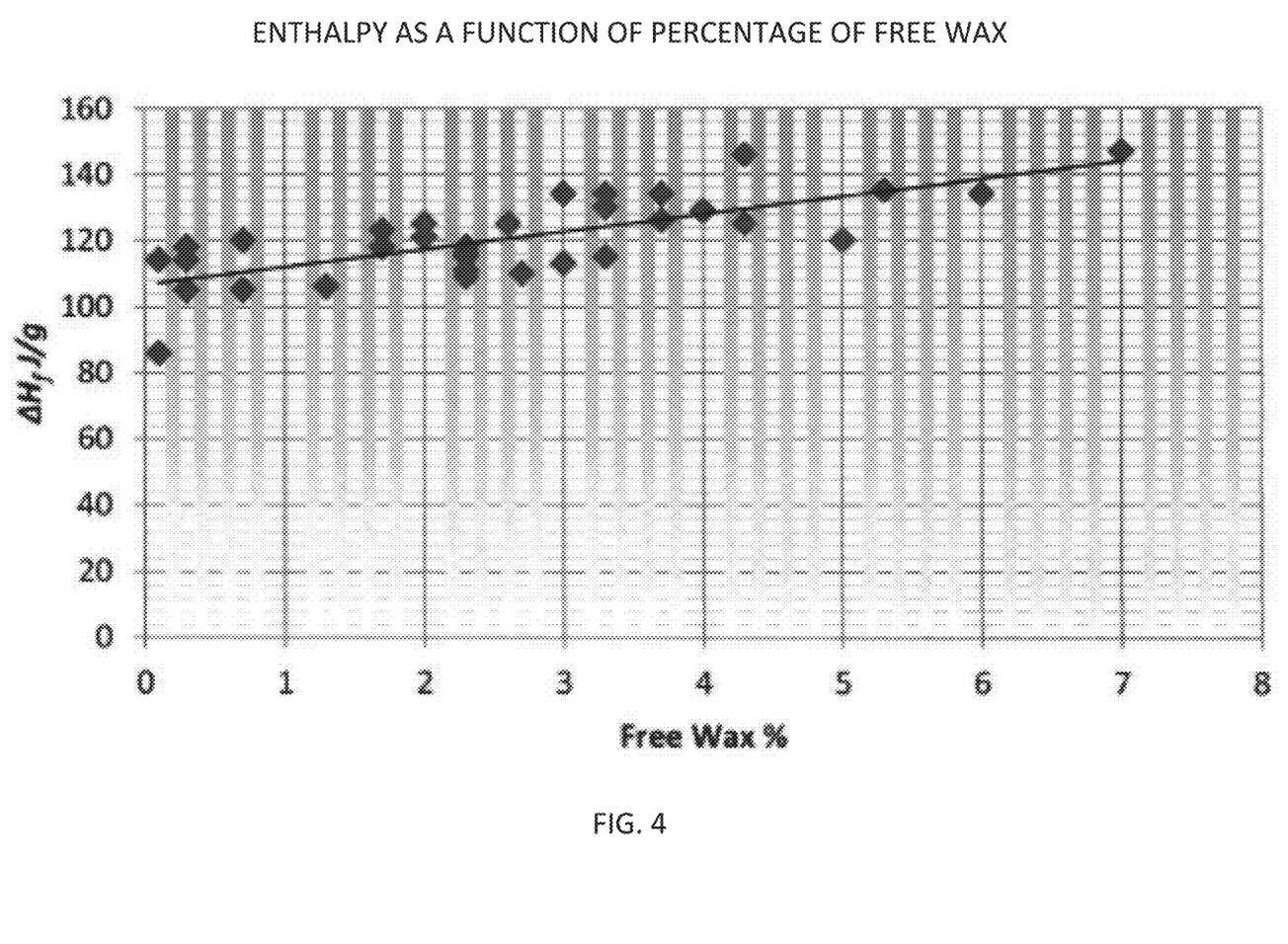
FIG. 4 is a graph of enthalpy as a function of the percentage of free wax for various PCMS from the table in FIGS. 2B and 2C.

Referring now to FIG. 4, the data in the graph demonstrates a generally linear relationship between the enthalpy of the dimensionally stable PCM 115, made according to the methods disclosed herein, and the percentage of free PCM (referred to as free wax in FIG. 4 because of the particular PCM used in the trials) allowed to remain with the dimensionally stable PCM. The amount of free PCM remaining may be manipulated during the filtering stage 110. For example, the enthalpy is increased by not filtering out as much PCM, which increases the percentage of free PCM contributing to the enthalpy. Accordingly, the enthalpy of the dimensionally stable PCM 115 may be tailored to fit a customer's needs by balancing an acceptable amount of free PCM for the ultimate end product against the desired enthalpy.

Comparative Examples

Figure 2A:
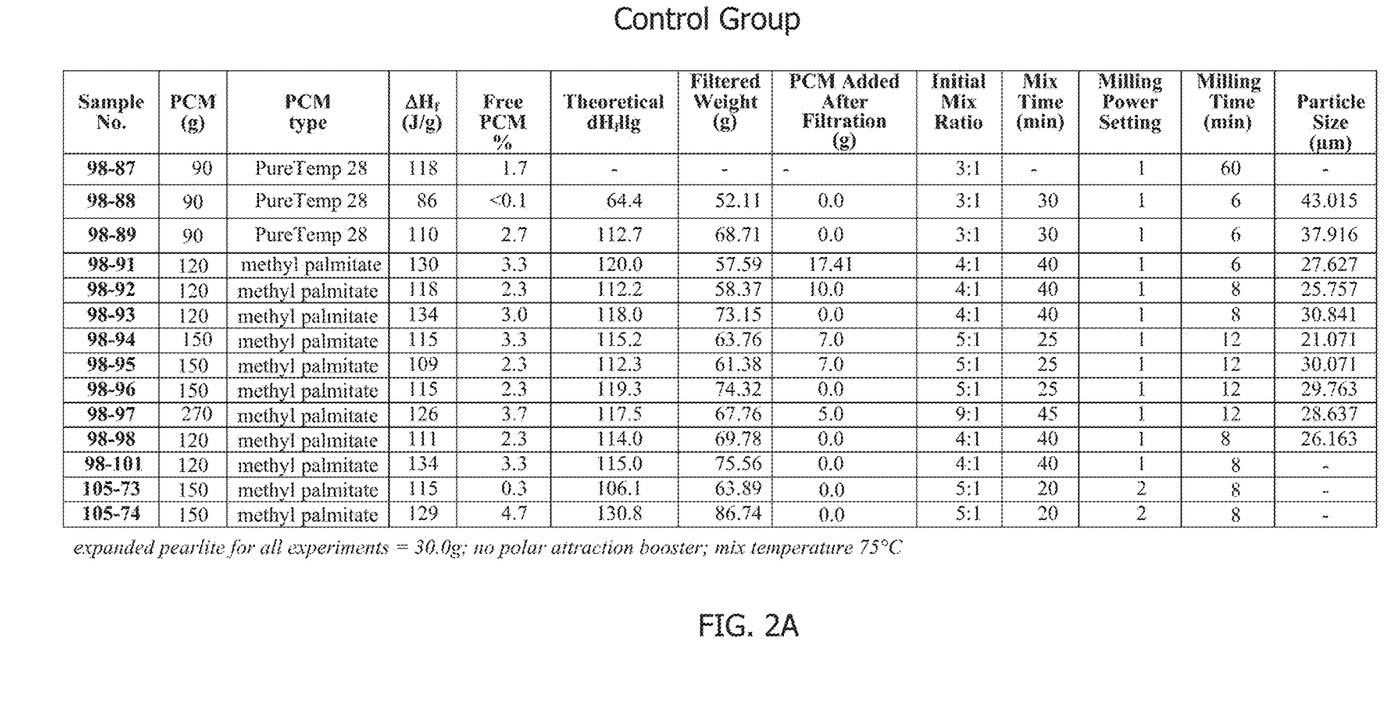
FIG. 2A is a chart of test results for a central group of various phase change materials absorbed/impregnated into expanded perlite.

Samples 98-87 through 98-98 and Samples 98-101, 105-73 and 105-74 in FIG. 2A are comparative examples of a PCM incorporated into a porous base material, expanded perlite, without the addition of a polar attraction booster. The remainder of the examples in FIGS. 2B and 2C include a polar attraction booster. ELVAX® 410 EVA copolymer resin (column 2 of the Table) was used in the majority of the trials. Sample 98-108 includes ELVAX 210W EVA copolymer resin, and sample 98-109 includes VYBAR' 103 hyperbranched polymer as the polar attraction booster, rather than ELVAX® 410 EVA copolymer resin.

Figure 2C:
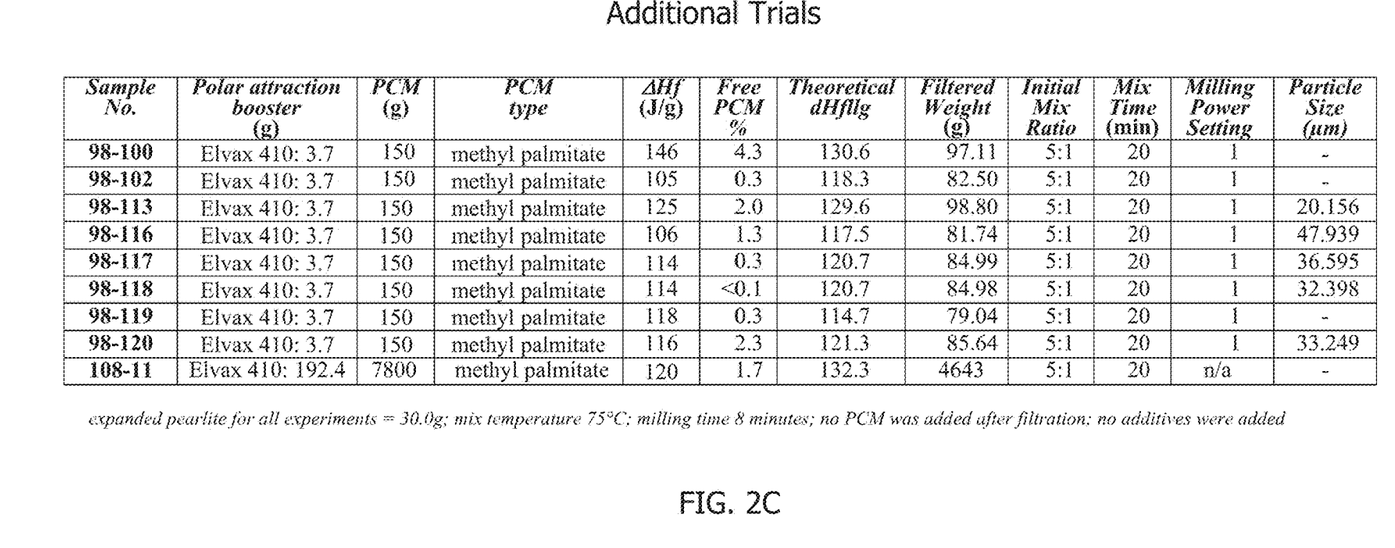
FIG. 2C is a chart of additional trials using methyl palmitate as the phase change material absorbed/impregnated into expanded perlite using the method of FIG. 1.

As seen from the data in FIGS. 2B and 2C, the samples that include a polar attraction booster require less time to reach the desired saturation of PCM in the porous base material, typically about 15 to about 20 minutes compared to 25 to 40 minutes. Additionally, the enthalpy was increased up to as much as 147 J/g (77% loading of PCM), but the amount of free PCM present also increases. The data also indicates that the benefit provided by ELVAX® 410 EVA copolymer resin in increasing the loading of the PCM in the expanded perlite has a maximum grams of ELVAX® 410 EVA copolymer resin to grams of PCM of about 0.025:1.

Figure 3:
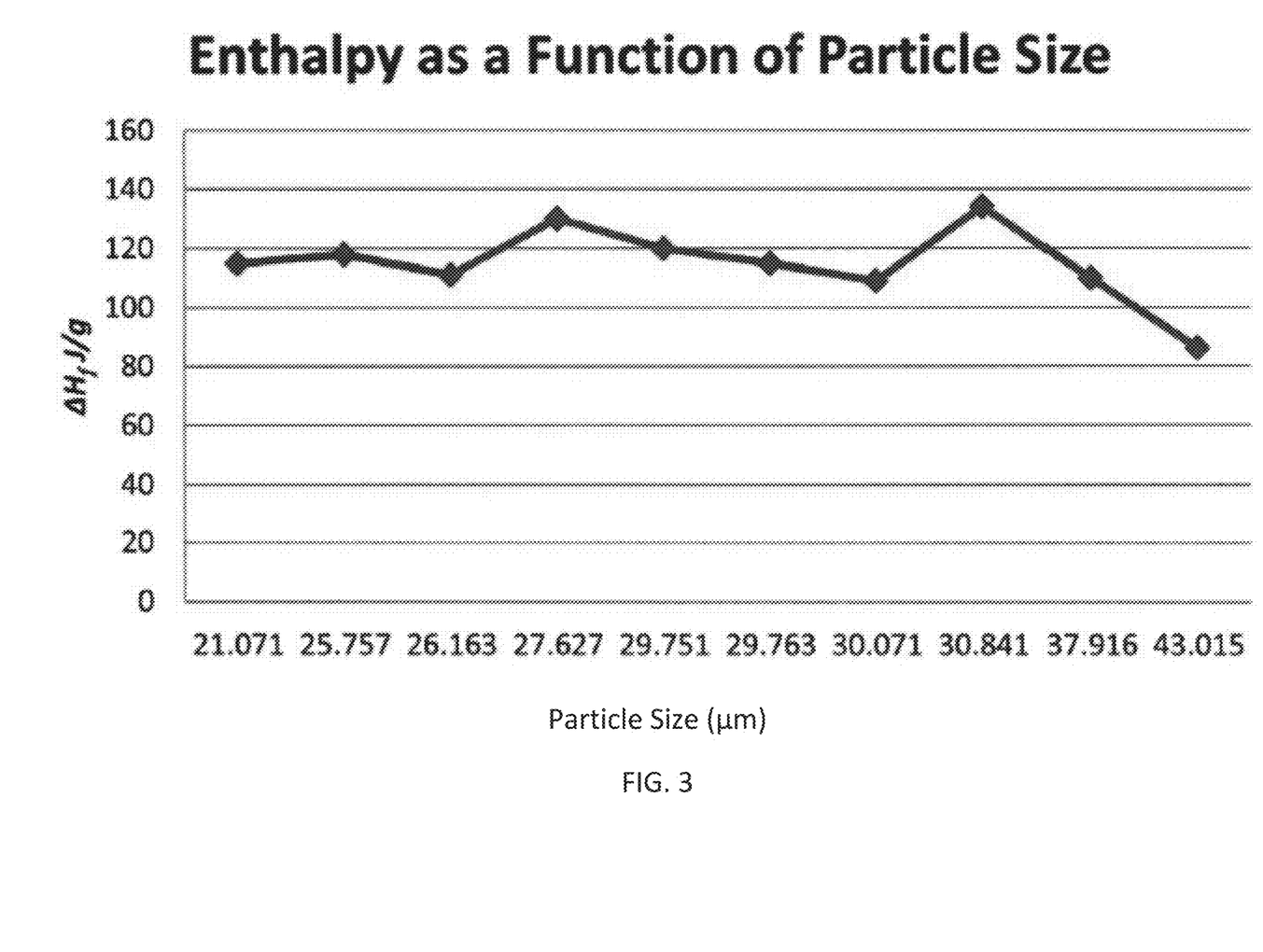
FIG. 3 is a graph of the enthalpy as a function of particle size for various PCMs from the table in FIGS. 2B and 2C.

Referring now to FIG. 3, the objective was to determine if the particle size affected the ability to hold and/or load the expanded perlite with the PCM, measured by the enthalpy. The data shows, over the range of particle sizes analyzed, that enthalpy is not particularly sensitive to particle size. The values were taken from various samples from FIGS. 2B and 2C.

The continuous process disclosed herein has many advantages, including that no vacuum is used to impregnate or adsorb the PCM into the porous base material. Additionally advantageous is that the particle size of the dimensionally stable PCMs can be selected using an emulsification process that does not significantly change the enthalpy thereof Also, the dimensionally stable PCMs have high thermal stability without the loss of the core PCM (i.e., minimal leakage overtime). The dimensionally stable PCMS also evidence no supercooling even after extended thermal cycling, as shown by DSC melting point and freezing points being numerically close together.

The embodiments of this invention shown in the drawings and described above are exemplary of numerous embodiments that may be made within the scope of the appended claims. In short, it is the Applicants' intention that the scope of the patent issuing herefrom be limited only by the scope of the appended claims.

What is claimed is:

1. A method for producing a dimensionally stable phase change material, the method comprising:
   providing porous particles;
   mixing a phase change material having a polar functional group with a substance that increases the polar attraction of the phase change material for the porous particles to form a mixture thereof; and
   mixing the mixture with the porous particles until a selected saturation of the mixture is impregnated within the pores of the porous particles.

2. The method of claim 1, further comprising filtering the porous particles after mixing with the mixture to form a cake of dimensionally stable phase change material particles.

3. The method of claim 2, further comprising reducing the size of the dimensionally stable phase change material particles to an average mean particle size of about 20 to about 50 μm.

4. The method of claim 1, further comprising adding one or more Lewis acids and/or Lewis bases to the phase change material before mixing with the porous particles.

5. The method of claim 2, further comprising introducing a filtrate, from the filtering of the porous particles after mixing with the mixture, into subsequent mixing of porous particles with the mixture.

6. The method of claim 1, further comprising heating, without vacuum, while mixing the porous particles with the mixture to impregnate the mixture within the pores of the porous particles.

7. The method of claim 1, wherein mixing of the phase change material and the substance that increases the polar attraction of the phase change material includes mixing equal parts thereof.

8. The method of claim 1, wherein the polar functional group of the phase change material includes one or more of an alcohol, glycol, ketone, ester, diesters, carboxylic acid, anhydride, epoxide, amine, nitrile, carbonate, and amide.

9. The method of claim 1, wherein the porous particles comprise expanded perlite.

10. The method of claim 1, wherein the phase change material comprises methyl palmitate.

11. The method of claim 1, wherein the substance that increases the polar attraction of the phase change material comprises vinyl acetate.

12. The method of claim 11, wherein the substance that increases the polar attraction of the phase change material comprises an ethylene-vinyl acetate copolymer resin.

13. The method of claim 3, wherein the dimensionally stable phase change material particles have a maximum of 2% free phase change material leakage and a minimum enthalpy of 125 J/g as measured by differential scanning calorimetry.

14. The method of claim 1, further comprising, after the selected saturation of the modified phase change material in the porous substrate is reached, emulsifying the mixture until an average mean particle size is within about 10 to about 50 μm.

\* \* \* \* \*